US009674691B2

(12) United States Patent
Lhamon et al.

(10) Patent No.: US 9,674,691 B2
(45) Date of Patent: Jun. 6, 2017

(54) POLLING BY UNIVERSAL INTEGRATED CIRCUIT CARD FOR REMOTE SUBSCRIPTION

(71) Applicant: T-Mobile USA, Inc., Bellevue, WA (US)

(72) Inventors: Ruskin Taylor Lhamon, Bainbridge Island, WA (US); Jean-Luc Rene Bouthemy, Sammamish, WA (US); Ovidiu Cristian Serban, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 109 days.

(21) Appl. No.: 14/659,299

(22) Filed: Mar. 16, 2015

(65) Prior Publication Data

US 2015/0271662 A1    Sep. 24, 2015

Related U.S. Application Data

(60) Provisional application No. 61/968,778, filed on Mar. 21, 2014.

(51) Int. Cl.
*H04W 4/00* (2009.01)
*H04W 8/18* (2009.01)
(Continued)

(52) U.S. Cl.
CPC .......... *H04W 8/183* (2013.01); *H04L 1/1607* (2013.01); *H04W 4/021* (2013.01); *H04W 8/205* (2013.01)

(58) Field of Classification Search
CPC combination set(s) only.
See application file for complete search history.

(56) References Cited

U.S. PATENT DOCUMENTS

| 8,406,761 B2 * | 3/2013 | Murray ................. H04W 8/245 370/230 |
| 2007/0070999 A1 | 3/2007 | Black et al. |

(Continued)

FOREIGN PATENT DOCUMENTS

| EP | 2680628 A1 | 1/2014 |
| WO | WO2013009045 A2 | 1/2013 |

OTHER PUBLICATIONS

PCT Search Report and Written Opinion mailed Mo. Jun. 8, 2015 for PCT Application No. PCT/US15/21043, 14 Pages.

*Primary Examiner* — Frank Duong
(74) *Attorney, Agent, or Firm* — Lee & Hayes, PLLC

(57) ABSTRACT

In some implementations, a universal integrated circuit card (UICC) of a computing device activates a primary mobile network operator (MNO) subscription profile associated with a primary MNO based on: (i) whether the computing device is connected to a network, (ii) whether the primary MNO subscription profile is active, and (iii) a number of unacknowledged messages to a message that is periodically sent from the computer to a server associated with the primary MNO. The primary MNO may provide network services to a first geographic area and a secondary MNO may provide network services to a second geographic area. After the computing device moves to the second geographic location from the first geographic location, the eUICC received a secondary MNO profile associated with the secondary MNO, activates the secondary MNO profile, and deactivates the primary MNO profile.

20 Claims, 10 Drawing Sheets

(51) Int. Cl.
*H04W 4/02* (2009.01)
*H04L 1/16* (2006.01)
*H04W 8/20* (2009.01)

(56) References Cited

U.S. PATENT DOCUMENTS

| | | | |
|---|---|---|---|
| 2012/0230179 A1* | 9/2012 | Cain | H04L 45/02 370/216 |
| 2012/0260090 A1* | 10/2012 | Hauck | H04L 63/0853 713/168 |
| 2014/0004827 A1* | 1/2014 | O'Leary | H04W 8/22 455/411 |
| 2014/0036893 A1 | 2/2014 | Bhanage et al. | |
| 2014/0140507 A1* | 5/2014 | Park | H04W 8/245 380/247 |

* cited by examiner

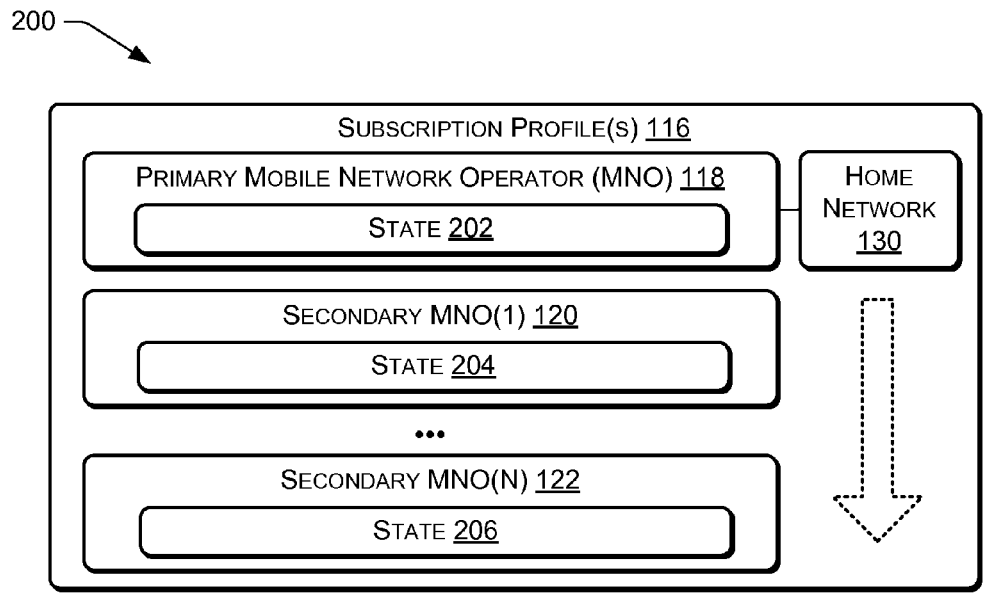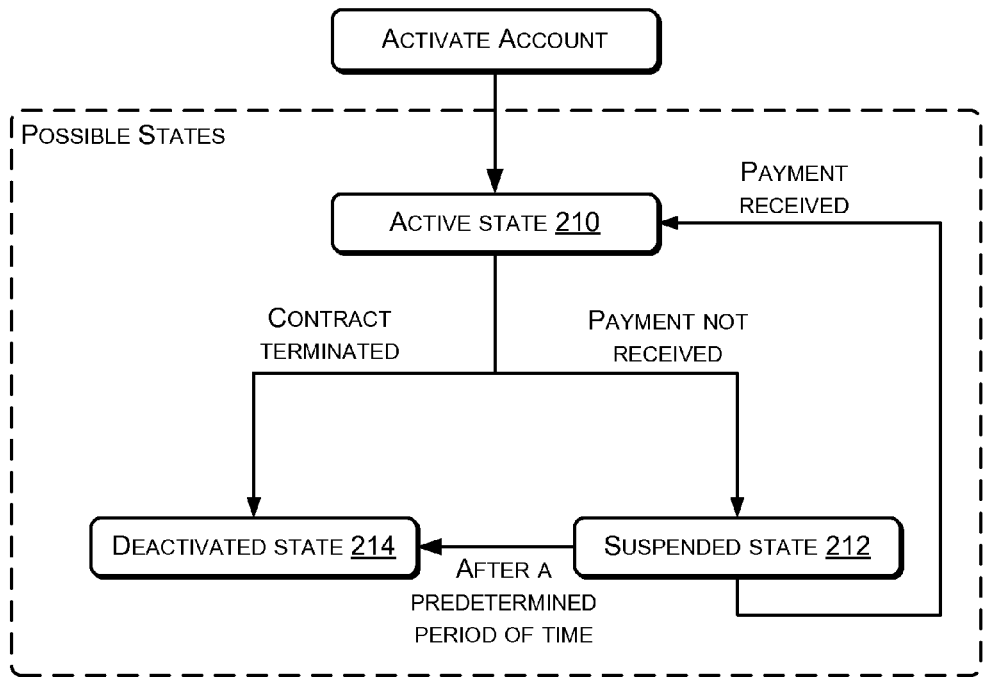
FIG. 2

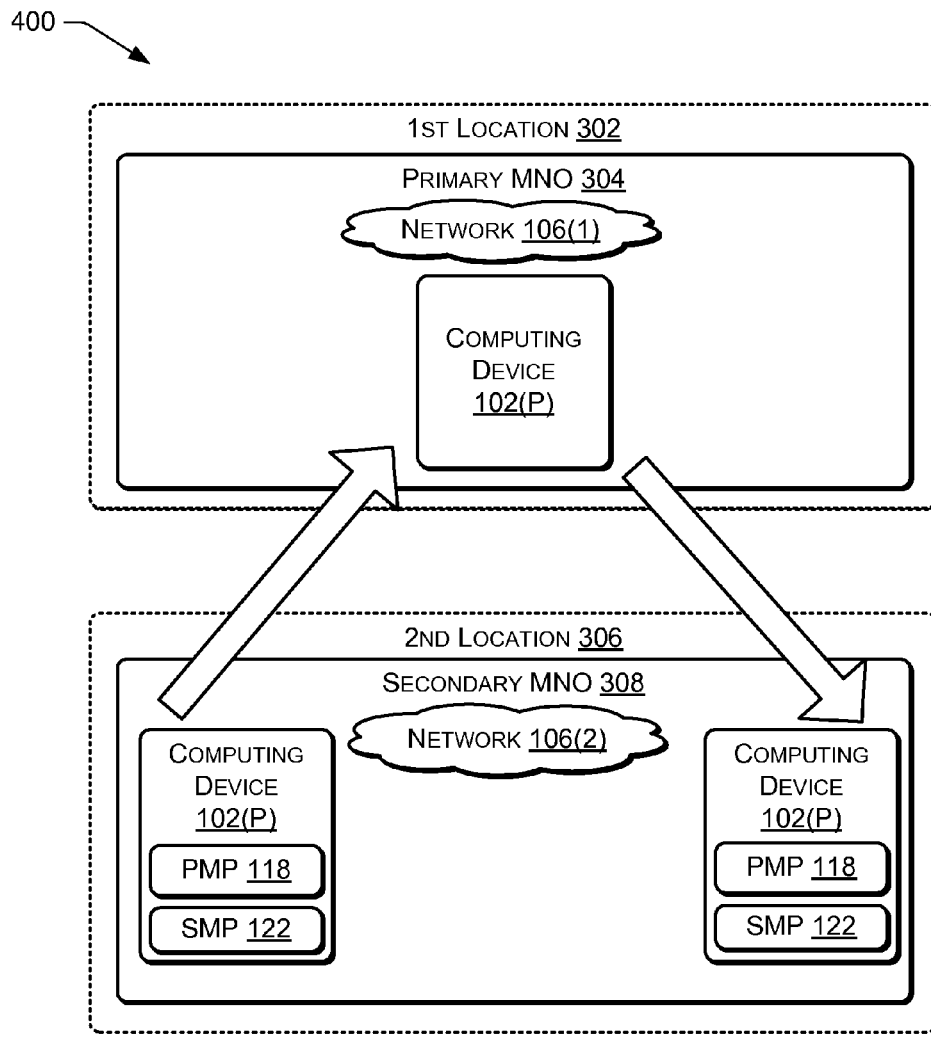

- EUICC HAS PRIMARY MNO PROFILE AND SECONDARY MNO PROFILE
- SECONDARY MNO PROFILE ENABLED, PRIMARY MNO PROFILE DEACTIVATED.
- SERVER DETECTS THAT THE COMPUTING DEVICE HAS MOVED FROM THE SECOND LOCATION TO THE FIRST LOCATION AND SENDS A REQUEST TO THE SUBSCRIPTION MANAGER
- EUICC RECEIVES A COMMAND TO SWAP PROFILES AND USE THE PRIMARY MNO PROFILE
- SERVER DETECTS THAT THE COMPUTING DEVICE HAS MOVED FROM THE FIRST LOCATION TO THE SECOND LOCATION AND SENDS A REQUEST TO THE SUBSCRIPTION MANAGER
- EUICC RECEIVES A COMMAND TO SWAP PROFILES AND USE THE SECONDARY MNO PROFILE

FIG. 4

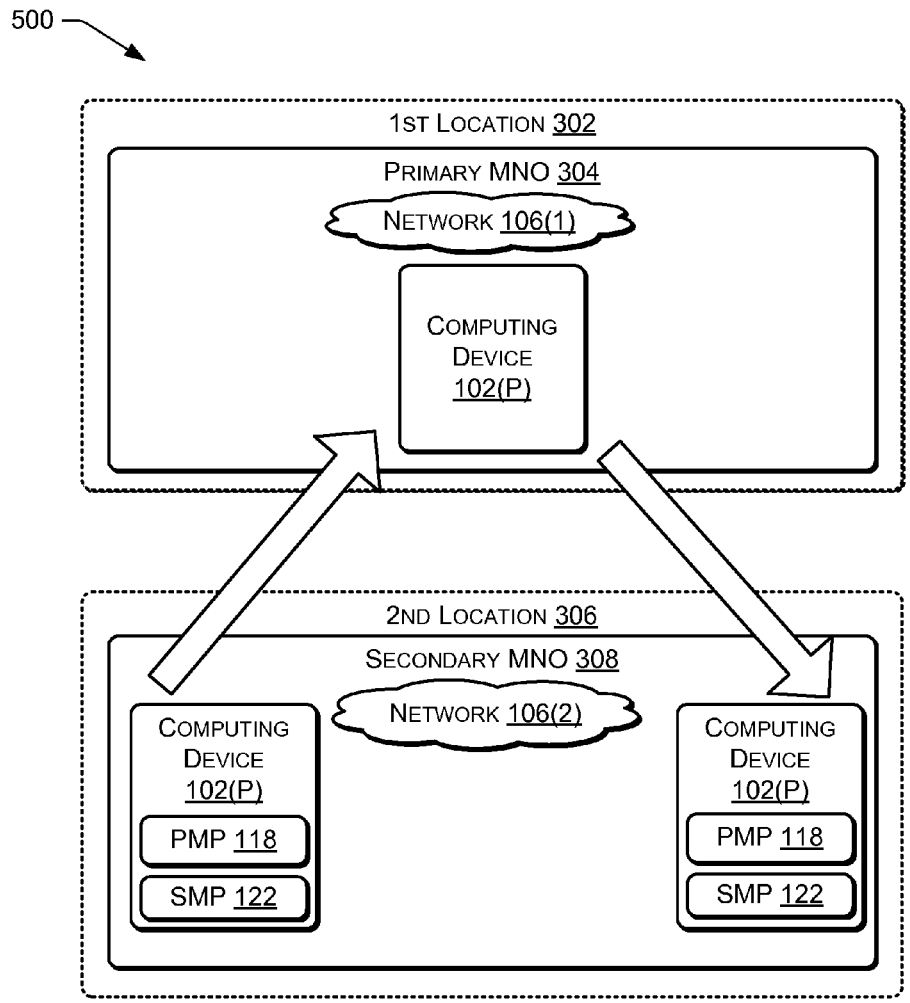

- EUICC HAS PRIMARY MNO PROFILE (DEACTIVATED) AND SECONDARY MNO PROFILE (HOME NETWORK)
- SERVER DETECTS THAT THE COMPUTING DEVICE HAS MOVED TO THE FIRST LOCATION (FROM SECOND LOCATION) AND SENDS REQUEST TO SUBSCRIPTION MANAGER
- EUICC RECEIVES COMMAND TO SWAP PROFILES AND USE THE PRIMARY MNO PROFILE
- SERVER DETECTS THAT COMPUTING DEVICE HAS MOVED FROM FIRST LOCATION TO NEW LOCATION WITHIN GUARD PERIOD, NO REQUEST SENT, PRIMARY MNO PROFILE REMAINS ENABLED AS HOME NETWORK
- SERVER DETECTS THAT COMPUTING DEVICE HAS MOVED AND IS IN A NEW LOCATION FOR AT LEAST THE GUARD PERIOD. 2ND NETWORK SENDS A REQUEST TO SUBSCRIPTION MANAGER
- EUICC RECEIVES COMMAND TO SWAP PROFILES AND USE SECONDARY MNO PROFILE

FIG. 5

POLLING BY UNIVERSAL INTEGRATED CIRCUIT CARD FOR REMOTE SUBSCRIPTION

RELATED APPLICATIONS

This application claims priority to U.S. provisional patent application No. 61/968,778, entitled "Heartbeat Messages for Subscriber Identity Modules" and filed on Mar. 21, 2014. Application No. 61/968,778 is fully incorporated herein by reference.

BACKGROUND

A Universal Integrated Circuit Card (UICC) is a smart card used in mobile terminals (e.g., wireless handsets) in global system for mobile (GSM) and universal mobile telephone service (UMTS) networks. The UICC includes a virtual (e.g., software based) subscriber identity module (SIM). The UICC may include information associated with the user, such as a unique subscriber identifier, a profile of services to which the subscriber has subscribed, etc.

A user may acquire a mobile terminal for use with a first mobile network operator (MNO) in a first location. There may be several situations in which the first MNO is not able to control what is happening with the mobile terminal. For example, the user may move to a second location and continue to use the mobile terminal with a second MNO that has a contract to provide service to users associated with first MNO. If the second MNO's contract with the first MNO is terminated (e.g., the second MNO is purchased by a rival MNO, etc.), the mobile terminal may become orphaned.

As another example, the second MNO may not be able to provide at least some of the services to which the user has subscribed. For example, the subscriber profile in the UICC may have become corrupted or may be out of sync with a corresponding subscriber profile stored at the second MNO's servers.

As yet another example, the subscriber profile on the UICC may cause connectivity issues, such as the second MNO blocking data traffic, the second MNO not supporting roaming for the user's mobile terminal, the second MNO not supporting short message service (SMS) or other types of traffic, etc.

These examples illustrate situations in which the user does not receive the services to which the user has subscribed. Encountering such situations may cause subscriber dissatisfaction and result in the loss of subscribers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 2 is a block diagram illustrating a system that includes subscription profiles according to some implementations.

FIG. 4 is a block diagram illustrating a system in which a computing device moves from a second location to a first location and back to the second location according to some implementations.

FIG. 5 is a block diagram illustrating a system in which a computing device moves from a first location and to a new location within a guard period according to some implementations.

DETAILED DESCRIPTION

Figure 1:
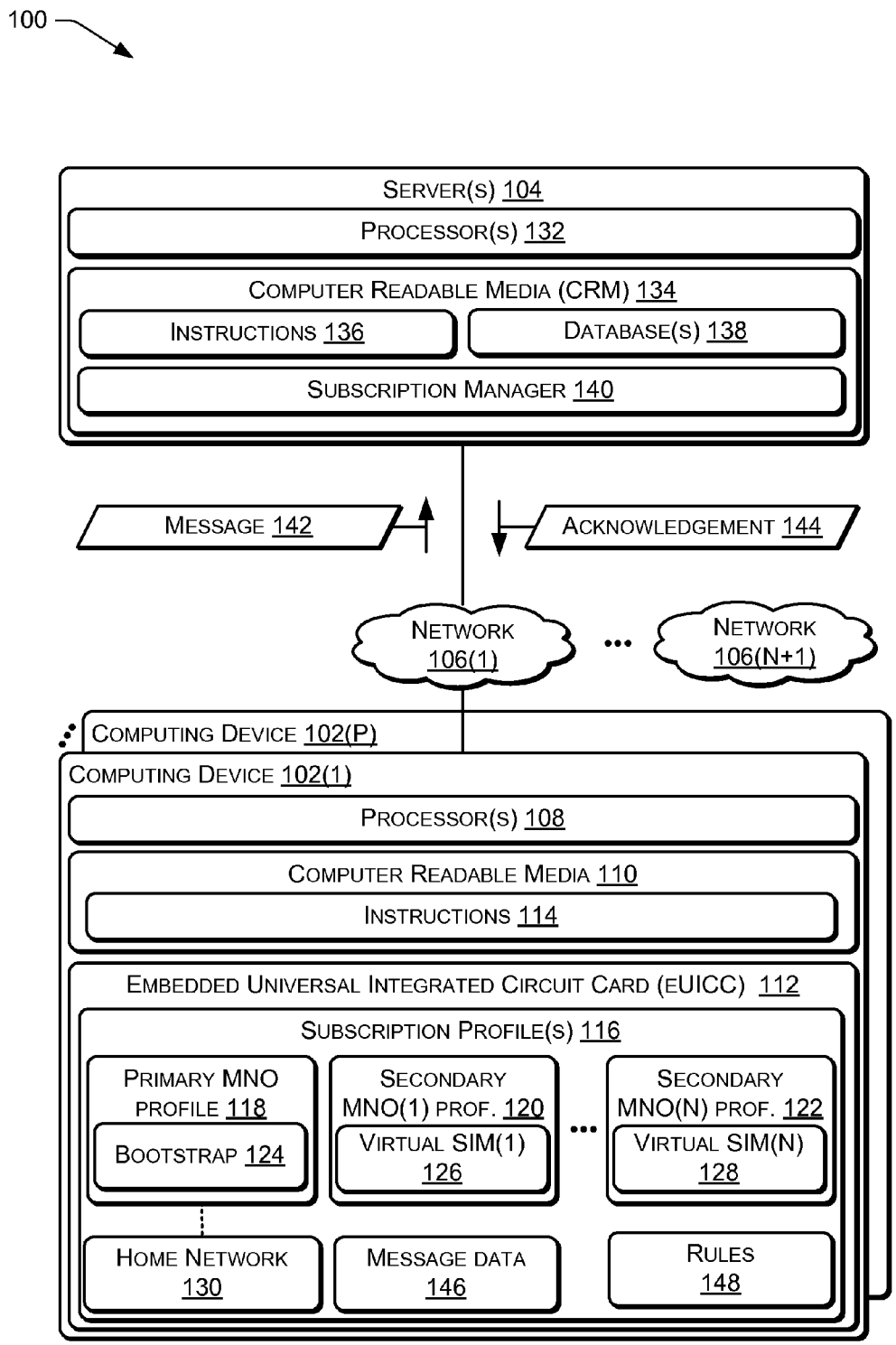
FIG. 1 is a block diagram illustrating a system that includes a computing device periodically sending a message according to some implementations.

A Universal Integrated Circuit Card (UICC) is used in a mobile device to uniquely identify a subscriber to telephone networks. The UICC includes a subscriber identity module (SIM), an integrated circuit to securely store an international mobile subscriber identity (IMSI) and related data used to identify and authenticate a subscriber.

An Embedded UICC (eUICC) is a smart card used in mobile terminals (e.g., wireless handsets) in wireless networks, such as global system for mobile (GSM) and universal mobile telephone service (UMTS) networks. The eUICC includes a virtual (e.g., software-based) subscriber identity module (SIM). The virtual SIM includes a unique serial number, IMSI, authentication and ciphering information, temporary information related to the local network, a list of services to which the user has access and one or more passwords (e.g., a personal identification number (PIN) for ordinary use and a personal unblocking code (PUK) for PIN unlocking).

The systems and techniques described herein enable a mobile network operator (MNO) to (1) prevent devices that were originally acquired for use on the MNO's network do not become orphaned, e.g., unable to access a network and (2) maintain control over devices even when they leave the geographic area served by the MNO's network. For example, the systems and techniques described herein may prevent a device from becoming orphaned if a subscriber terminates a contract with an MNO.

As another example, a device may become orphaned or unable to receive at least some services from a local MNO if the virtual SIM profile is corrupted or out of sync with profiles stored in databases (e.g., home location register (HLR), Home Subscriber Server (HSS), Over The Air (OTA) activation platform, etc.) managed by the local MNO. To illustrate, the IMSI in the virtual SIM and in the MNO's database may not match, the Mobile Station International Subscriber Directory Number (MSISDN) in the virtual SIM and in the MNO's database may not match, keys in the virtual SIM and in the MNO's database may not match, etc. The systems and techniques described herein may be used to address such situations.

Additional situations that may be addressed by the systems and techniques described herein include connectivity issues such as a current MNO (i) blocking data traffic (or steering it to a different location), (ii) not supporting roaming on the network to which the virtual SIM is currently connected, (iii) not supporting short message service (SMS) or other types of traffic. Roaming refers to the ability for a computing device to automatically access network services when travelling outside a geographical coverage area of a home network, by using a secondary network.

The systems and techniques describe how an eUICC periodically (e.g., at a predetermined time interval) sends a message to a server and keeps track of whether the server acknowledges the message and how many messages are acknowledged. For example, the message may be sent using SMS, Internet Protocol (e.g. Bearer Independent Protocol as defined in TS 102 223), or another type of electronic messaging protocol. The server may be associated with the original MNO from whom the device was acquired, referred to herein as the primary MNO. If the device encounters connection problems (e.g., the device is unable to send the SMS or IP message to the server, the device does not receive acknowledgment messages from the server, or both), then the eUICC automatically (e.g., without human interaction) switches to the primary MNO subscription (also referred to as the bootstrap subscription).

After switching to the primary MNO, the eUICC may re-connect with the primary MNO's server and receive commands from the server to test the eUICC, retrieve data (e.g., logs) from the eUICC, update data (e.g., IMSI, access point name (APN) configuration, MSISDN, etc.) stored in the eUICC, etc.

To avoid a situation where multiple computing devices send messages at approximately the same time, the server may instruct individual eUICCs as to when to send a next message, resulting in the messages being sent out over a period of time. Thus, the server may assign each eUICC a unique time for the eUICC to periodically send the message to the server.

In addition, the systems and techniques described herein may cause the eUICC to send data from the UCC to the server when specific situations occur. For example, the eUICC may send data to the server to indicate a change of the mobile network being used by the device. A system applet on the eUICC may monitor data being broadcast (e.g. system information on a broadcast channel) by the mobile network and monitor data received by the computing device associated with the eUICC. For example, if the data indicates a particular type of change (e.g., Mobile Country Code change, Mobile Network Code change, etc.), then the eUICC sending the data to the server may trigger one or more events. For example, the data sent to the server may result in the server instructing the eUICC to download a new subscription profile and swap subscriptions if no subscription is available to the eUICC with a new MNO. As another example, the data sent to the server may result in the server instructing the eUICC to swap subscriptions if a subscription is available to the eUICC with a new MNO. As yet another example, the data sent by the eUICC may include error reports, performance metrics/statistics (e.g., call completion rate, data transmission rates, connection failures, re-tries, etc.), and other information. Based on the data, the server may modify parameters in the eUICC to improve performance, reduce errors, reduce failures, reduce retries, etc. The computing devices may send "heartbeat" messages using more than one type of communication technology. For example, the "heartbeat" messages may be sent via cellular data, short message service (SMS), circuit switched voice, WiFi® (e.g., IEEE 802.11), Bluetooth®, ZigBee® (IEEE 802.15.4), Ethernet®, etc. and the MNO's server may determine future communication configuration states based on the results/acknowledgements of the heartbeat messages. For example, a computing device may initially send heartbeat messages using more than one communication technology. If the server is able to reliably receive messages from the computing device via one particular type of communication technology (e.g., WiFi), the server may instruct the computing device to send subsequent heartbeat messages using the particular type of communication technology.

In this way, devices that regularly cross geographic boundaries (e.g. tracking on trucks or containers) may use local subscriptions whenever possible, providing a better experience compared to international roaming, enable devices with embedded eUICCs to be manufactured on a large scale for the global market and sold in different countries, and enable network service providers to deploy solutions in multiple countries. The systems and techniques create an ecosystem owned by the primary MNO in which other MNOs provide coverage to devices by providing for the automatic download and selection of other MNO profiles by the eUICC. For example, when a device with an eUICC associated with a United States-based MNO (e.g., T-Mobile®) is used in Canada, a profile provided by a local MNO (e.g., Rogers®) may be downloaded and activated, enabling the eUICC to operate as if the device was a Canadian subscriber (e.g., rather than roaming) while in Canada, resulting in a better user experience and lower user costs.

FIG. 1 is a block diagram illustrating a system 100 that includes computing devices that periodically send a message according to some implementations. The system 100 includes one or more computing devices 102(1) to 102(P) (where P>0) that are communicatively coupled to one or more server(s) 104 via a network 106(1). Each of the networks 106(1) to network(N+1) may be associated with an MNO (where N>1) and may include one or more wireless networks and/or wired networks. The wireless networks may use various protocols, such as, for example, one or more of global system for mobile (GSM), code division multiple access (CDMA), long term evolution (LTE), general packet radio system (GPRS), enhanced data rates for GSM evolution (EDGE), universal mobile telephone service (UMTS), 802.11, Bluetooth, another type of wireless protocol, or any combination thereof. The wired networks may use various protocols, such as, for example, one or more of data over cable service interface specification (DOCSIS), digital subscriber line (DSL), fiber optics, Ethernet, another type of wired protocol, or any combination thereof.

Each of the computing devices 102(1) to (N) may include a processor 108, computer readable media 110, and an eUICC 112. The computer readable media 110 may include software code, such as instructions 114, that are executable by the processors 108 to perform various functions, including initiating voice calls, receiving (e.g., terminating) voice calls, sending/receiving SMS (e.g., text) messages, sending/receiving electronic mail (email) messages, connecting to or disconnecting from the Internet, etc.

The eUICC 112 may include one or more subscription profiles 116, where each subscription profile is associated with a particular MNO. When initially activated, the computing device 102(1) may include a single subscription profile of a primary MNO 118. For example, the primary MNO 118 may be an MNO that provides the computing device 102(1) for acquisition to customers (e.g., subscribers). If the computing device 102(1) leaves the geographic area in which the primary MNO 118 provides coverage (e.g., via the network 106(1)), then the computing device 102(1) may download and activate a subscription profile associated with another MNO. For example, the computing device 102(1) may download and activate one or more secondary MNO profiles, such as the secondary MNO(1) profile 120 to the secondary MNO(N) profile 122. In some cases, the computing device 102(1) may download and activate a secondary MNO profile even in a geographic location that is served (e.g., provided network coverage) by the primary MNO. For example, in the United States, T-Mobile® may be the bootstrap and primary MNO and AT&T (or another MNO) may have coverage that overlaps with T-Mobile and may have secondary MNO subscriptions available in the overlapping MNOs. As another example, in Germany, a computing device with T-Mobile® as the primary MNO may download secondary MNO profiles from Deutsche Telecom (DT), Telefonica, or both.

Each of the subscription profiles 116 may have an associated virtual SIM profile. For example, the primary MNO 118 may have an associated bootstrap virtual SIM profile 124, the secondary MNO(1) profile 120 may have an associated virtual SIM(1) profile 126, and the secondary MNO (N) profile 122 may have an associated virtual SIM(N) profile 128. At any given time, only one of the subscription profiles 116 is designated as a home network 130. Which of the subscription profiles 116 is designated as the home network 130 may depend on factors, such as how long a computing device has been operating in a coverage area of an MNO's network, a specific geographic location of the computing device, contractual arrangements with other MNOs, etc. Initially, e.g., when the computing device 102(1) is initialized and provided to a subscriber, the primary MNO 118 is designated as the home network 130. When the computing device 102(1) moves to a location where the network 106(1) of the primary MNO 118 does not provide coverage or if requested by the Subscription Manager 140, the computing device 102(1) may connect to a secondary MNO (e.g., one of the secondary MNO(1) 120 to MNO(N)) profiles that has a contractual arrangement with the primary MNO 118. If the computing device 102(1) continues to operate in a location where the secondary MNO provides coverage for more than predetermined period of time, or is located in a particular geographical zone, then the computing device 102(1) may download and activate a corresponding subscription profile, such as the secondary MNO(N) profile 122. In such a situation, the secondary MNO(N) profile 122 may be designated as the home network 130 to enable the secondary MNO(N) profile 122 to treat the computing device 102(1) as if it was a subscriber device rather than the device of a roaming partner.

Each of the networks 106(1) to 106(N+1) may have one or more servers 104 to provide various subscriber services. Each of the servers 104 may include one or more processors 132 and one or more computer readable media 134 (e.g., memory, disk drives, sold state drives, and other types of storage devices). The computer readable media 134 may include instructions 136 that are executable by the one or more processors 132 to perform various functions provided by an MNO. The computer readable media 134 may include one or more databases 138 and a subscription manager 140. The databases 138 may include a home location register (HLR), a Home Subscriber Server (HSS), an Over The Air (OTA) activation platform, and other databases maintained by an MNO. The subscription manager 140 may keep track of subscription-related information, such as when a subscription was started, when the subscription will end, what services are included in the subscription, secondary MNOs with whom the primary MNO has a contractual relationship, etc.

When the computing device 102(1) is initialized, the subscription profiles 116 of the computing device 102(1) may include the primary MNO 118. The primary MNO 118 may be designated as the home network 130. The computing device 102(1) may periodically send a message 142 to one or more of the servers 104 associated with the primary MNO 118. For example, the computing device 102(1) may send the message 142 at an interval (e.g., a predetermined interval, a specified interval, or another type of time interval), such as every hour, every four hours, every twelve hours, every day, etc. The subscription manager 140 may set the predetermined time interval at which the computing device 102(1) sends the message 142. The message 142 may be referred to as a 'heartbeat' message.

In response to receiving the message 142, one of the servers 104 may determine the subscription status of the computing device 102(1), determine the services to which the computing device 102(1) has subscribed, and determine other subscription-related information associated with the computing device 102(1). If the servers 104 determine that the computing device 102(1) has a valid subscription, one of the servers 104 may send an acknowledgement 144 to the message 142. The eUICC 112 may keep track of message data 146, such as, for example, whether the message 142 was acknowledged by the servers 104 and, if the message 142 was unacknowledged, the eUICC 112 may keep track (e.g., using the message data 146) as to how many messages were unacknowledged, how much time has elapsed since a most recent acknowledgement 144 was received, etc. For example, the computing device 102(1) may move to a geographic location where the network 106(1) associated with the primary MNO 118 profile is not accessible, and download the secondary MNO(N) 122 profile to access the network 106(N+1) associated with the secondary MNO(N) 122 profile. The eUICC 112 may designate the secondary MNO(N) 122 profile as the home network 130. Under some circumstances, the message 142 may not be acknowledged by the servers 104. For example, if data becomes corrupted (e.g., profile data stored in the secondary MNO(N) 122 profile does not match subscription data stored in one or more of the databases 138), then the message 142 may not be acknowledged by the servers 104. As another example, the message 142 may not be acknowledged by the servers 104 if the relationship between a primary MNO and a secondary MNO becomes disrupted, e.g., due to a contractual dispute or the acquisition of the secondary MNO by a competitor of the primary MNO.

The eUICC 112 may determine whether to revert back to the primary MNO 118 profile (e.g., from the secondary MNO(N) profile), based on rules 148. For example, the rules 148 may specify to revert back to the primary MNO 118 profile based on (i) how many messages are unacknowledged, (ii) how much time has elapsed since a most recent acknowledgement 144 was received, (iii) based on other factors or any combination thereof. To illustrate, if more than X messages (where X>0) have gone unacknowledged or the most recent acknowledgement 144 was received more than Y hours ago (where Y>0), then the eUICC 112 may determine that one or more of the conditions specified by the rules 148 are satisfied and revert back to the primary MNO 118 profile. For example, the eUICC 112 may designate the primary MNO 118 profile as the home network 130 rather than the secondary MNO(N) 122 profile, resulting in the computing device 102(1) using the bootstrap SIM 124.

Thus, a computing device may receive service from a first MNO using a subscription profile associated with the first MNO. The computing device may move from the first area in which service was provided by the first MNO to a second area in which service is provided by a second MNO. The eUICC may download and activate a subscription profile associated with the second MNO and designate the second MNO as the home network.

An eUICC in the computing device may be configured to periodically send a message (e.g., a heartbeat message) to a server. The server may check subscription-related information associated with the computing device. If the server determines that the computing device is to be provided service (e.g., the computing device has a valid subscription), then the server may send an acknowledgement message acknowledging the message sent by the computing device. If the server determines that the computing device does not have a valid subscription or is receiving services that it should not be receiving, then the server may not send an acknowledgement message in response to the message sent by the computing device or may send an error message to the computing device. The eUICC may gather data, such as how many messages have been unacknowledged, an amount of time since a most recent acknowledgment was received, etc. If the gathered data satisfies one or more rules, the eUICC may revert back to the first MNO by designating the first MNO profile as the home network.

In this way, if the computing device encounters problems when the second MNO profile is designated as the home network, the computing device may revert back to a profile (e.g., bootstrap profile) of the first MNO.

FIG. 2 is a block diagram illustrating a system 200 that includes subscription profiles according to some implementations. Each of the subscription profiles 116 may have a corresponding state. For example, the primary MNO 118 profile may have a state 202, the secondary MNO(1) 120 profile may have a state 204, and the secondary MNO(N) 122 profile may have a state 206.

The possible states of the states 202, 204, and 206 include an active state 210, a suspended state 212, and a deactivated state 214. For example, when an account at an MNO is initially activated a subscription profile, such as the primary MNO 118 profile, may have the active state 210. If the customer's payment is not received within a particular period of time after a bill is sent, the subscription profile (e.g., the primary MNO 118 profile) may be placed in the suspended state 212. If the customer, within a predetermined period of time, makes a payment such that the customer's account is no longer in arrears, the subscription profile may be placed back in the active state 210. After the predetermined period of time, if the customer's account remains in arrears, the subscription profile may be placed in the deactivated state 210. In addition, if the customer or the primary MNO terminates the contract, the subscription profile may be placed in the deactivated state 210.

Figure 3:
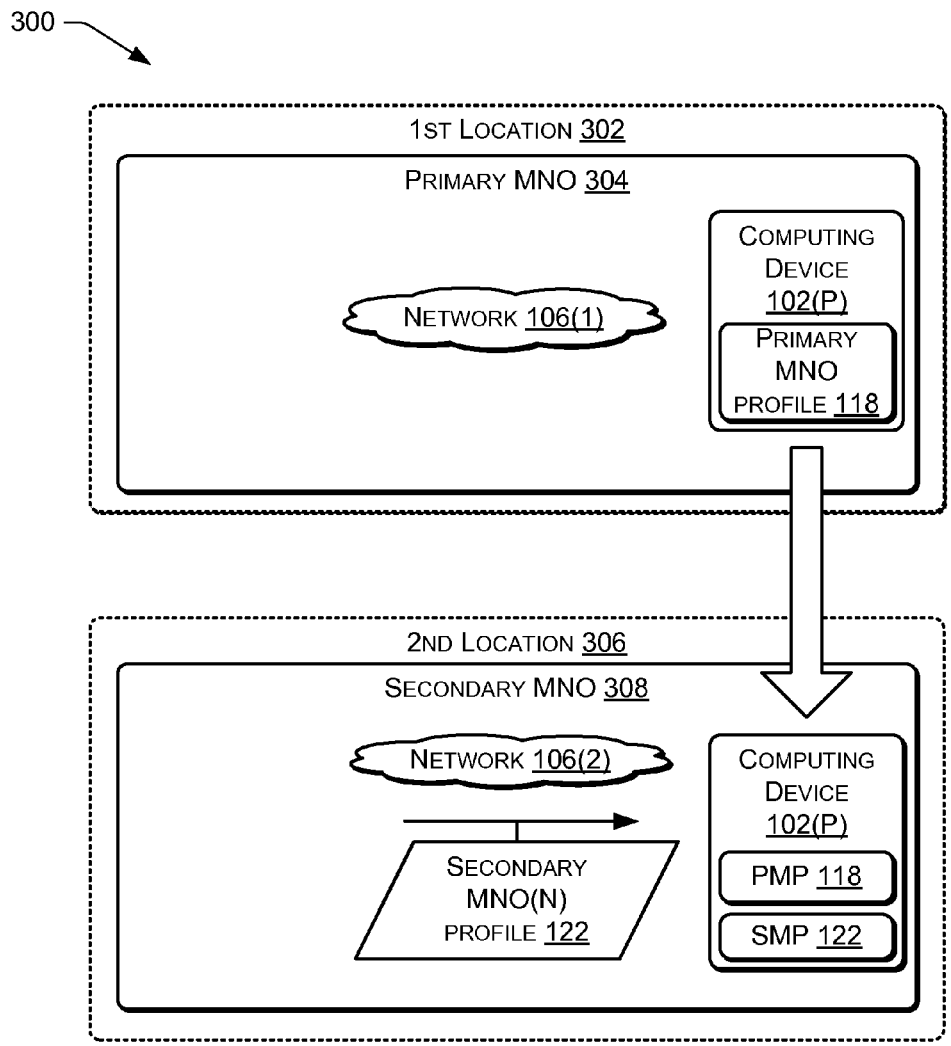
FIG. 3 is a block diagram illustrating a system in which a computing device moves from a first location to a second location according to some implementations.

FIG. 3 is a block diagram illustrating a system 300 in which a computing device moves from a first location to a second location according to some implementations. When the computing device 102(P) (where P>0) is provided to a customer, the computing device 102(P) may be located in a first location 302 in which service is provided by a primary MNO 304 using the network 106(1). When the primary MNO 304 is providing service to the computing device 102(P), the primary MNO profile 118 may be designated as the home network.

The computing device 102(P) may be transported to a second location 306 where the primary MNO 304 does not provide service. For example, the first location 302 (e.g., Western United States) and the second location 304 (e.g., Eastern United States) may be in a same country. As another example, the first location 302 may be in a first country (e.g., United States of America) and the second location 306 may be in second country (e.g., Canada). A secondary MNO 308 may provide service in the second location 306 using the network 106(2). If the computing device 102(P) is located in the second location 306 for more than a predetermined period of time, the network 106(2) may send a request to the subscription manager 140 of FIG. 1 asking to switch the computing device 102(P) over to the network 106(2). The subscription manager 140 may determine that the secondary MNO 308 is contractually affiliated with the primary MNO 304 and may (i) instruct the computing device(N) 102 to download the secondary MNO(N) profile 122 or (ii) instruct the secondary MNO 308 to send the secondary MNO(N) profile 122 to the computing device 102(P). The eUICC of the computing device 102(P) may be instructed to designate the secondary MNO(N) profile 122 of the secondary MNO 308 as the home network. The eUICC of the computing device 102(P) may be instructed to deactivate the primary MNO profile 118. In some cases, when the computing device 102(P) begins operating in the second location 306, the computing device 102(P) may roam with a secondary MNO. After being located in the second location 306 for more than a pre-determined period of time, the computing device 102(P) may download and activate the secondary MNO(N) profile 122. In some cases, the secondary MNO(N) profile 122 may be associated with the secondary MNO with which the computing device 102(P) was previously roaming. In other cases, the secondary MNO(N) profile 122 may be associated with a different secondary MNO from the secondary MNO with which the computing device 102(P) was roaming.

FIG. 4 is a block diagram illustrating a system 400 in which a computing device moves from a second location to a first location and back to the second location according to some implementations. Temporally, the system 400 describes what occurs in the system 300 after the secondary MNO(N) profile 122 is designated as the home network and the primary MNO profile 118 is deactivated.

The eUICC of the computing device 102(P) includes both the primary MNO profile 118 and the secondary MNO(N) profile 122, with the primary MNO profile 118 deactivated and the secondary MNO(N) profile 122 designated as the home network.

When the computing device 102(P) is moved from the second location 306 back to the first location 302, a server (e.g., one of the servers 104 of FIG. 1) detects that the computing device 102(P) is now in the first location 302 that is served by the primary MNO 304. The server sends a request to the subscription manager 140 of FIG. 1, asking if the primary MNO 304 can be designated as the home network. If the subscription manager 140 determines that the primary MNO 304 can be designated as the home network, then the subscription manager 140 instructs the eUICC to swap subscription profiles, e.g., designate the primary MNO profile 118 as the home network and deactivate the secondary MNO(N) profile 122.

At a later point in time, when the computing device 102(P) is moved from the first location 302 to the second location 306, the server detects that the computing device 102(P) is now in the second location 306 that is served by the secondary MNO 308. The server sends a request to the subscription manager 140, asking if the secondary MNO 308 can be designated as the home network. If the subscription manager 140 determines that the secondary MNO 308 can be designated as the home network, then the subscription manager 140 instructs the eUICC to swap subscription profiles, e.g., by designating the secondary MNO(N) profile 122 as the home network and deactivating the primary MNO profile 118.

FIG. 5 is a block diagram illustrating a system in which a computing device moves from a first location and to a new location within a guard period according to some implementations. Temporally, the system 400 describes what occurs in the system 300 after the secondary MNO(N) profile 122 is designated as the home network and the primary MNO profile 118 is deactivated.

At this point in time, the eUICC of the computing device 102(P) includes both the primary MNO profile 118 and the secondary MNO(N) profile 122, with the primary MNO profile 118 deactivated and the secondary MNO(N) profile 122 designated as the home network.

When the computing device 102(P) is moved to the first location 302 from the second location 306, a server (e.g., one of the servers 104 of FIG. 1) detects that the computing device 102(P) is currently in the first location 302 that is served by the primary MNO 304. The server sends a request to the subscription manager 140 of FIG. 1, requesting that the primary MNO 304 be designated as the home network. If the subscription manager 140 determines that the primary MNO 304 can be designated as the home network, then the subscription manager 140 instructs the eUICC to swap subscription profiles, e.g., designate the primary MNO profile 118 as the home network and deactivate the secondary MNO(N) profile 122.

At a later point in time, when the computing device 102(P) is moved from the first location 302 to the second location 306, the server detects that the computing device 102(P) is now in the second location 306 that is served by the secondary MNO 308. The nserver monitors the location of the computing device 102(P). If the server determines that computing device 102(P) is located in the second location 306 for less than a predetermined period of time, known as a guard period, then the server does not send a request to the subscription manager 140 to designate the secondary MNO 308 as the home network. Instead, the computing device 102(P) may remain with the network 106(2) of the secondary MNO 308 and the primary MNO profile 118 may remain designated as the home network.

If the server determines that computing device 102(P) is located in the second location 306 for at least the guard period (or longer), then the server sends a request to the subscription manager 140, asking if the secondary MNO 308 can be designated as the home network. If the subscription manager 140 determines that the secondary MNO 308 can be designated as the home network, then the subscription manager 140 instructs the eUICC to swap subscription profiles, e.g., by designating the secondary MNO(N) profile 122 as the home network and deactivating the primary MNO profile 118.

In the flow diagrams of FIGS. 6, 7, 8, 9, and 10, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600, 700, 800, 900, and 1000 are described with reference to the systems 100, 200, 300, 400, and 500 as described above, although other models, frameworks, systems and environments may implement these processes.

Figure 6:
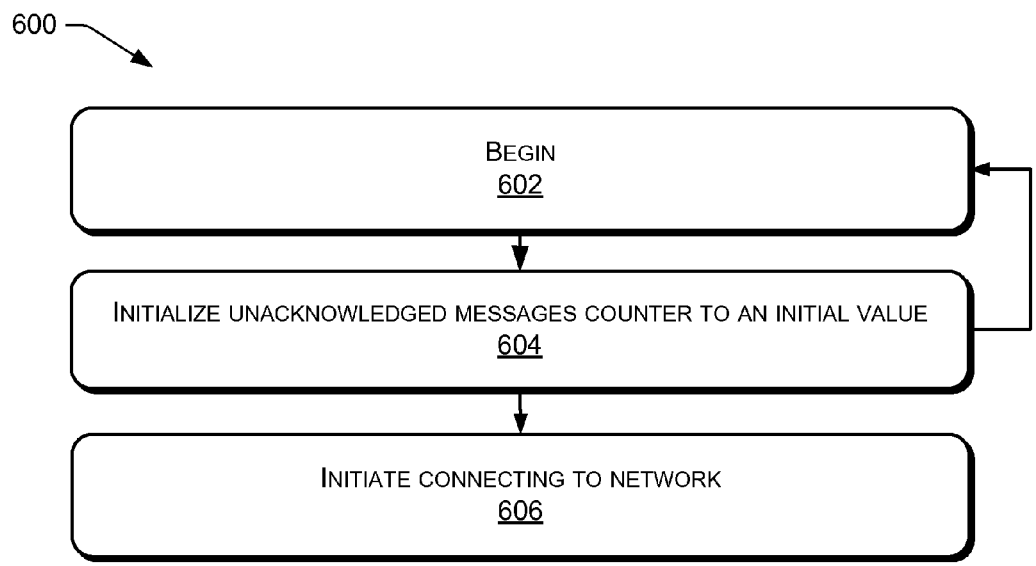
FIG. 6 is a flow diagram of an example process that includes beginning a process to connect to a network according to some implementations.

FIG. 6 is a flow diagram of an example process 600 that includes beginning a process to connect to a network according to some implementations. The process 600 may be performed by a UICC of a computing device, such as the eUICC 112 of FIG. 1.

At 602, the process begins. For example, the process 600 may begin when the computing device 102(1) is initialized.

At 604, an unacknowledged messages counter may be initialized to zero. For example, in FIG. 1, the message data 146 may include a counter to keep track of how many of the messages 142 are unacknowledged. The counter may be initialized to an initial value, such as zero. While a counter is used to illustrate how the eUICC may keep track of unacknowledged messages, in some implementations, other types of data structures may be used to keep track of unacknowledged messages.

At 606, connecting to a network is initiated. For example, the eUICC may identify one or more MNO networks that are available and send a message requesting service to at least one MNO network of the one or more MNO networks. For example, in FIG. 1, the computing device 102(1) may determine that the networks 106(1) to network 106(N+1) are available and send a message requesting access to at least one of the networks.

Figure 7:
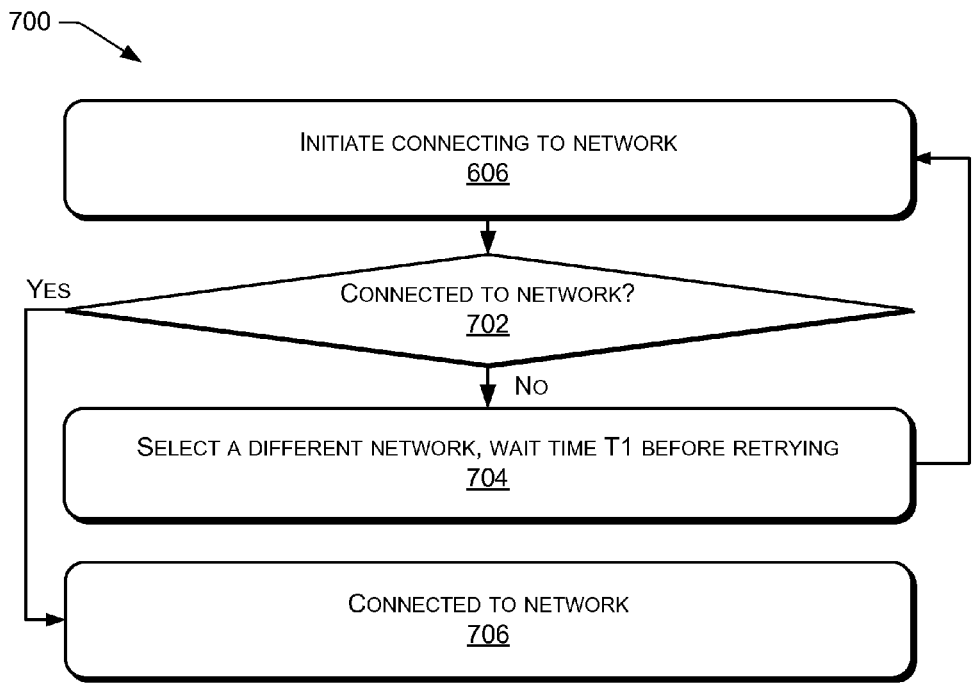
FIG. 7 is a flow diagram of an example process that includes initiating connecting to a network according to some implementations.

FIG. 7 is a flow diagram of an example process 700 that includes initiating connecting to a network according to some implementations. The process 700 may be performed by a UICC of a computing device, such as the eUICC 112 of FIG. 1.

At 702, a determination is made whether the eUICC was able to connect to an available network. If a determination is made, at 702, that the eUICC was able to connect to a network, then the computing device associated with the eUICC has a status of being connected to the network, at 706.

If a determination is made, at 702, that the eUICC was unable to connect to a network, then the computing device, at 704, selects a different network to initiate connecting to, waits a predetermined period of time T1, and proceeds to 606 to initiate connecting to the selected network. For example, in FIG. 1, the computing device 102(1) may periodically (e.g., at a time interval) request to connect to at least one of the networks 106(1) to 106(N+1). The eUICC 112 may initiate connecting to an available network using a variety of techniques. For example, the eUICC 112 may initiate connecting to a cellular (e.g., GSM or UMTS) network, a WiFi® network, a ZigBee® network, a Bluetooth® network, or another available network. The eUICC 112 may initiate connecting to an available network by selecting a different subscription profile. For example, the eUICC 112 may select each of the subscription profiles 116, in turn, until the eUICC 112 is able to connect to a network. The eUICC 112 may cycle through the subscription profiles 116 by repeatedly selecting each of the subscription profiles 116, in turn, until the eUICC 112 is able to connect to a network. For example, the eUICC 112 may select the primary MNO profile 118 and attempt to connect to the primary MNO's network. If a connection is not made, the eUICC 112 may select the secondary MNO(1) profile 120 and attempt to connect to the corresponding secondary MNO's network. If a connection is not made, the eUICC 112 may continue selecting the secondary MNO(N) profile 122 and attempt to connect to the corresponding secondary MNO's network until the eUICC 112 has tried connecting to each of the secondary MNOs. If a connection is not made, the eUICC 112 may go back and repeat the process by selecting the primary MNO profile 118 and attempting to connect to the primary MNO's network. Thus, the eUICC 112 may try connecting using available subscription profiles and available connection options (including non-cellular, such as WiFi, ZigBee, etc.). If the eUICC 112 is unable to connect via any of these means, the eUICC 112 will enter into a "retry" mode which starts with the bootstrap MNO and cycles through all available connection options and subscription profiles according to a retry algorithm. If the eUICC 112 is able to establish a connection to a network, then the "heartbeat" messages will resume and the subscription manager will instruct the eUICC 112 with regard to setting the primary MNO, designating the home network, etc.

Figure 8:
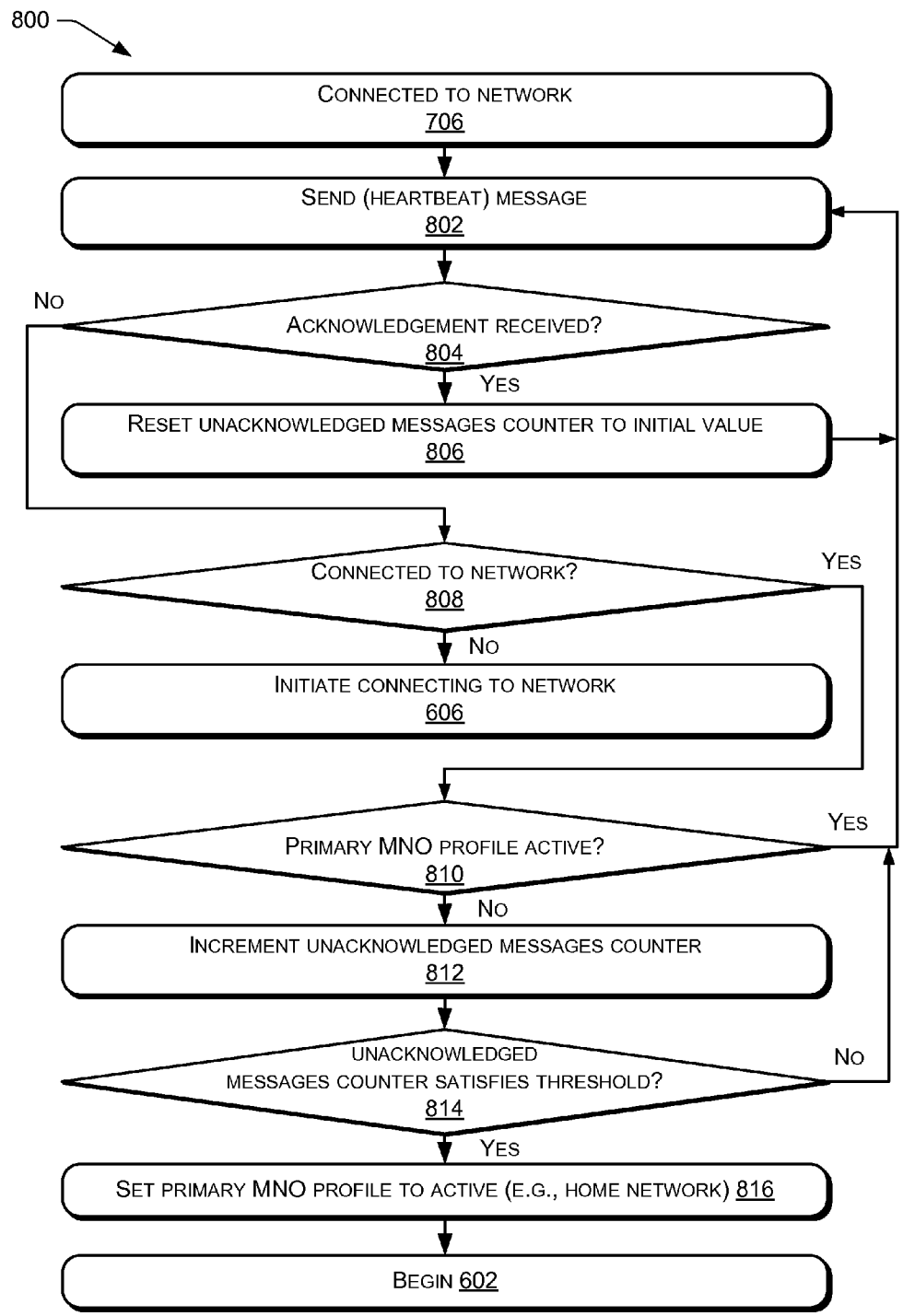
FIG. 8 is a flow diagram of an example process that includes periodically sending a message to a network according to some implementations.

FIG. 8 is a flow diagram of an example process 800 that includes periodically sending a message to a network according to some implementations. The process 800 may be performed by a UICC of a computing device, such as the eUICC 112 of FIG. 1.

At 802, the eUICC may periodically (e.g., at a predetermined interval specified by the primary MNO) send a message (e.g., a heartbeat message) to a server. If a determination is made, at 804, that an acknowledgement to the message is received, then the process may, optionally, reset the unacknowledged messages counter, at 806, and proceed to 802, where a message is periodically sent. For example, in FIG. 1, the eUICC 112 may periodically send the message 142 to one of the servers 104. The message 142 may be sent at a predetermined interval that is configurable by the primary MNO. For example, the message 142 may be sent every hour, every 4 hours, every 8 hours, every 12 hours, every day, etc. The eUICC 112 may keep track of how many of the messages 142 are unacknowledged, using the message data 146. In some implementations, when the eUICC 112 receives an acknowledgement 144, an unacknowledged messages counter (e.g., stored in the message data 146) may be reset. The message data 146 may include various predetermined time intervals (e.g., how often the message 142 is sent to the servers 104), thresholds (e.g., how many unacknowledged messages trigger an action, such as swapping subscription profiles), and other data related to the message 142.

If a determination is made, at 804, that an acknowledgement to the message was not received, then a determination is made, at 808, whether the computing device is still connected to the network. If a determination is made, at 808, that the computing device is no longer connected to the network, then the process proceeds to 606, and initiates connecting to the network. For example, in FIG. 1, if the eUICC 112 determines that (i) the acknowledgement 144 was not received (e.g., the message 142 was unacknowledged) and (ii) the computing device 102(1) is not connected to a network, then the eUICC 112 may send a request asking to connect to one of the networks 106(1) to 106(N+1).

If a determination is made, at 808, that the computing device is still connected to the network, then a determination is made, at 810, whether the primary MNO profile is active. If a determination is made, at 810, that the primary MNO profile is active, then the process proceeds to 802, where a message is periodically sent. For example, in FIG. 1, if the eUICC 112 determines that (i) the message 142 is unacknowledged (e.g., the computing device 102(1) did not receive the acknowledgement 144 corresponding to the message 142), (ii) the computing device 102(1) is connected to one of the networks 106(1) to 106(N+1), and (iii) the primary MNO profile 118 is active (e.g., designated as the home network 130), then the eUICC 112 may, after a predetermined time interval, send a subsequent message 142.

If a determination is made, at 810, that the primary MNO is inactive, then the unacknowledged messages counter is incremented, at 812. At 814, a determination is made whether the unacknowledged messages counter satisfies a threshold. If a determination is made, at 814, that the unacknowledged messages counter does not satisfy the threshold, then the process proceeds to 802, where a message is periodically sent. If a determination is made, at 814, that the unacknowledged messages counter satisfies the threshold, then the primary MNO profile (e.g., bootstrap profile) is set as the home network, at 816, and the process proceeds to 602, where the process begins again. For example, in FIG. 1, if the eUICC 112 determines that (i) the message 142 is unacknowledged (e.g., the computing device 102(1) did not receive the acknowledgement 144 corresponding to the message 142), (ii) the computing device 102(1) is connected to one of the networks 106(1) to 106(N+1), and (iii) the primary MNO profile 118 is deactivated, then the eUICC 112 may increment the number of unacknowledged messages counter and, after a predetermined interval, send a subsequent message 142.

Figure 9:
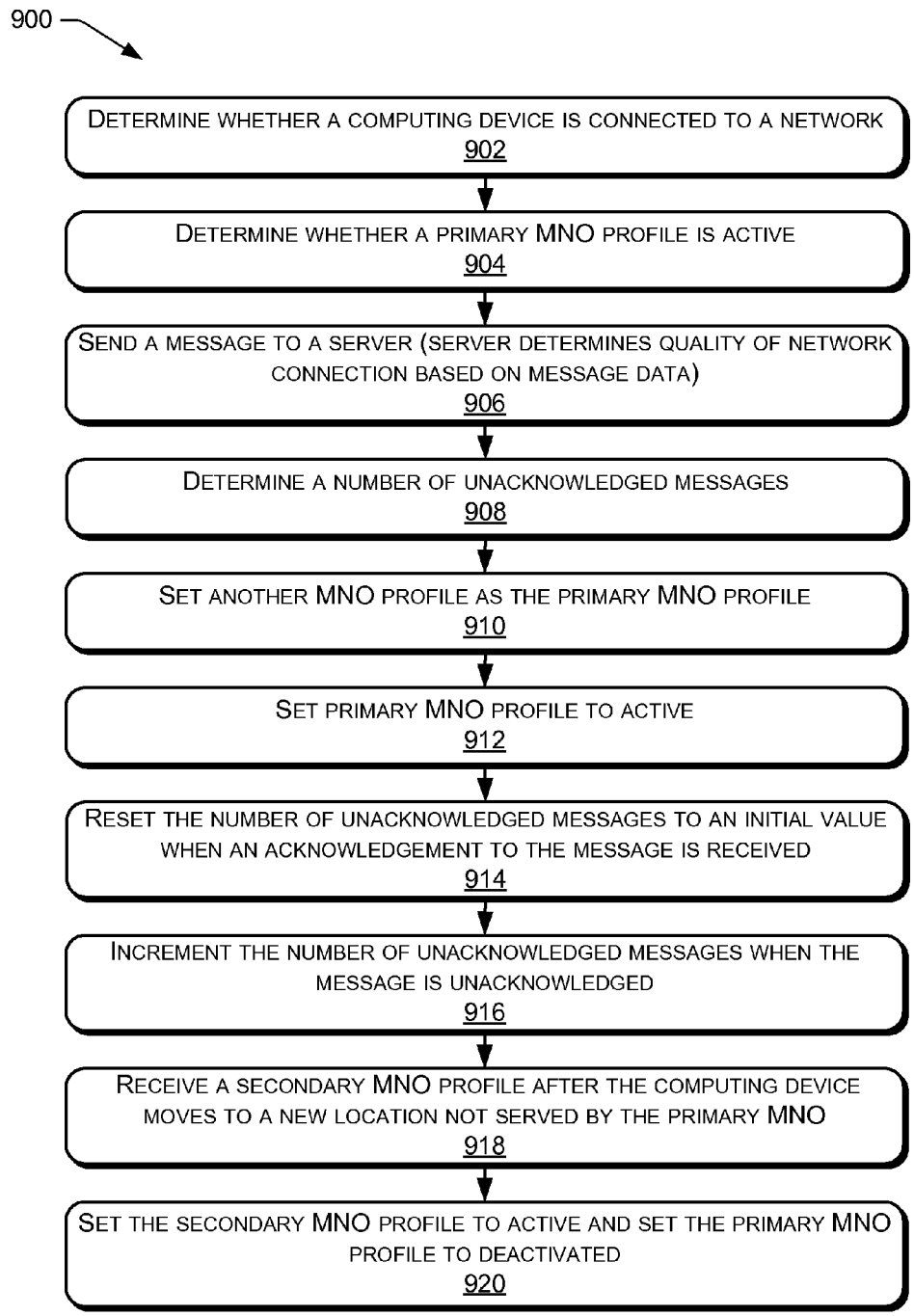
FIG. 9 is a flow diagram of an example process that includes determining a number of unacknowledged messages according to some implementations.

FIG. 9 is a flow diagram of an example process 900 that includes determining a number of unacknowledged messages according to some implementations. The process 900 may be performed by a UICC of a computing device, such as the eUICC 112 of FIG. 1.

At 902, a determination may be made whether a computing device is connected to a network. At 904, a determination may be made whether a primary MNO profile is active. At 906, a message is set to a server. For example, the computing device may send a message to a server. The message may include information associated with a quality of one or more network connections available to the computing device. For example, in FIG. 1, the computing device 102(1) may send the message 142 to the servers 104 identifying at least one of the networks 106(1) to 106(N+1) that is available to the computing device 102(1) and an indication as to a quality of the available connection. To illustrate, the message may indicate that network 106(1) is unavailable, network 106(2) is available but is unreliable (e.g., 50% dropouts), network 106(3) is available and is reliable (e.g., less than 10% dropouts), etc. At 908, a number of unacknowledged messages is determined. At 910, another MNO profile may (optionally) be designated as the primary MNO profile. For example, in FIG. 1, the subscription manager 140 may receive an available network message from the computing device 102(1) indicating available networks and a corresponding connection quality associated with each available network. Based on this information and based on relationships between the primary MNO and other MNOs, the subscription manager 140 may instruct the eUICC 112 to select another MNO as the primary MNO profile 118. For example, one of the secondary MNO(1) profile 120 to MNO(N) profile 122 may be selected as the primary MNO profile 118. As another example, the subscription manager 140 may send a new MNO profile to the eUICC 112 and instruct the eUICC 112 to set the new MNO profile as the primary MNO profile 118. At 912, the primary MNO subscription profile is activated. For example, in FIG.

1, the eUICC 112 may activate the primary MNO profile 118 when (i) the computing device 112 is connected to one of the networks 106(1) to 106(N+1), (ii) the primary MNO profile is active, and (iii) the number of unacknowledged messages does not satisfy a predetermined threshold.

At 914, if an acknowledgement is received to the message sent (at 906) to the server, then the number of unacknowledged messages may be reset to an initial value. For example, in FIG. 1, the eUICC 112 may reset the number of unacknowledged messages (in the message data 146) to zero if the acknowledgement 144 corresponding to the message 142 is received.

At 916, if the message sent (at 906) to the server is unacknowledged, then the number of unacknowledged messages is incremented. For example, in FIG. 1, the eUICC 112 may increment the number of unacknowledged messages (in the message data 146) if the message 142 is unacknowledged.

At 918, a secondary MNO subscription profile is received after the computing device moves to a new location that is not served by the primary MNO. At 920, the secondary MNO subscription profile is set to active and the primary MNO subscription profile is deactivated. For example, in FIG. 3, after the computing device 102(P) is moved from the first location 302 to the second location 306, the computing device may receive the secondary MNO(N) profile 122, activate the second MNO(N) profile 122, and deactivate the primary MNO profile 118.

Figure 10:
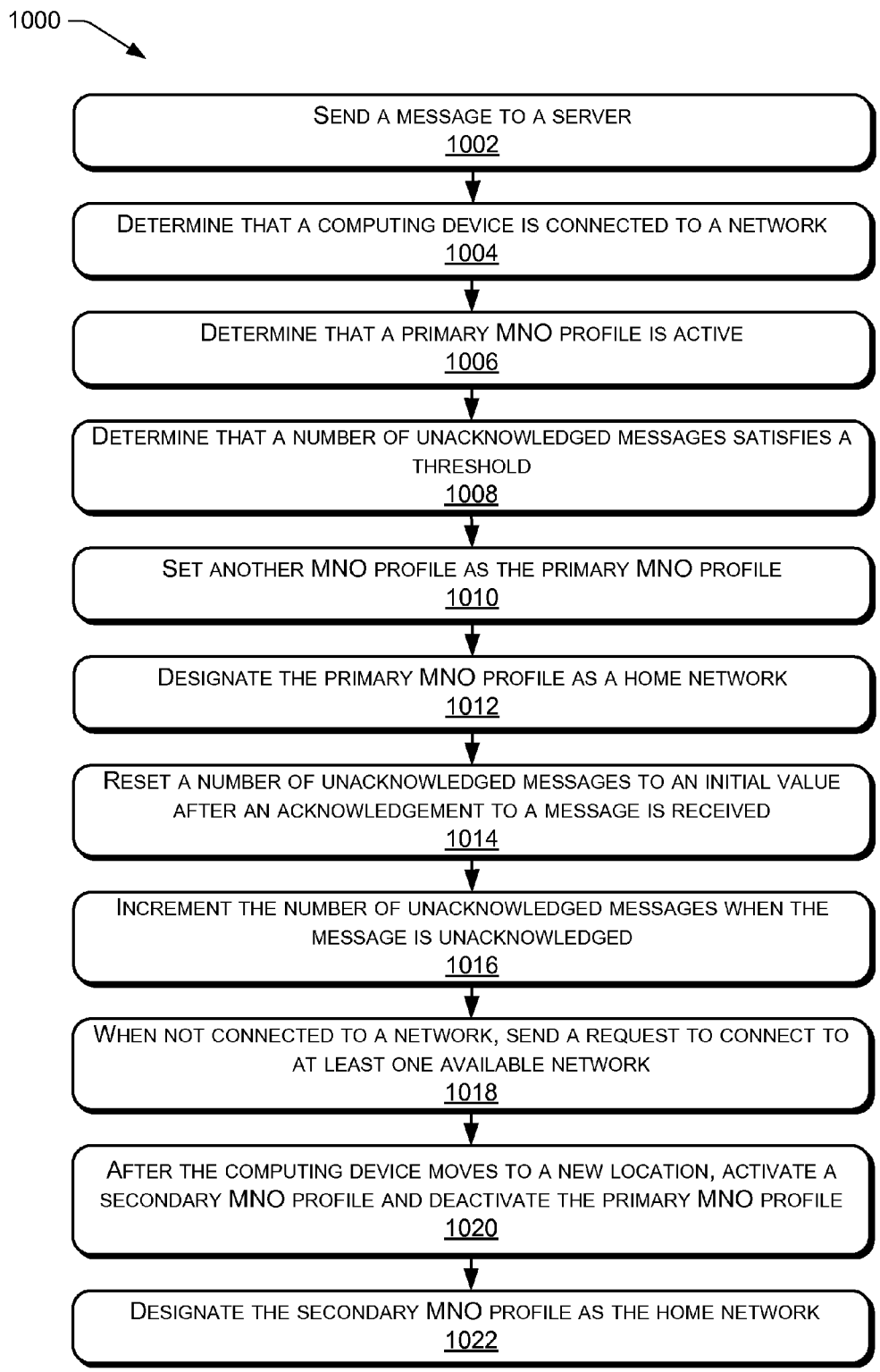
FIG. 10 is a flow diagram of an example process that includes designating a primary mobile network operator (MNO) as a home network according to some implementations.

FIG. 10 is a flow diagram of an example process 1000 that includes designating a primary mobile network operator (MNO) as a home network according to some implementations. The process 1000 may be performed by a UICC of a computing device, such as the eUICC 112 of FIG. 1.

At 1002, message is sent to a server. For example, in FIG. 1, the eUICC 112 may send the message 142 to at least one of the servers 104.

At 1004, a determination may be made that a computing device is connected to a network. At 1006, a determination may be made that a primary MNO profile is active. At 1008, a determination may be made as to whether a number of unacknowledged messages satisfies a threshold. At 1010, another MNO profile may (optionally) be designated as the primary MNO profile. For example, in FIG. 1, the subscription manager 140 may receive an available network message from the computing device 102(1) indicating available networks and a corresponding connection quality associated with each available network. Based on this information and based on relationships between the primary MNO and other MNOs, the subscription manager 140 may instruct the eUICC 112 to select another MNO as the primary MNO profile 118. For example, one of the secondary MNO(1) profile 120 to MNO(N) profile 122 may be selected as the primary MNO profile 118. As another example, the subscription manager 140 may send a new MNO profile to the eUICC 112 and instruct the eUICC 112 to set the new MNO profile as the primary MNO profile 118. At 1012, the primary MNO subscription profile is designated as a home network. For example, in FIG. 1, the eUICC 112 may designate the primary MNO profile 118 as the home network 130 when (i) the computing device 112 is connected to one of the networks 106(1) to 106(N+1), (ii) the primary MNO profile is active, and (iii) the number of unacknowledged messages satisfies a predetermined threshold.

At 1014, if an acknowledgement is received to the message sent (at 1002) to the server, then the number of unacknowledged messages may be reset to an initial value. For example, in FIG. 1, the eUICC 112 may reset the number of unacknowledged messages (in the message data 146) to zero if the acknowledgement 144 corresponding to the message 142 is received.

At 1016, if the message sent (at 1002) to the server is unacknowledged, then the number of unacknowledged messages is incremented. For example, in FIG. 1, the eUICC 112 may increment the number of unacknowledged messages (in the message data 146) if the message 142 is unacknowledged.

At 1018, if the computing device is not connected to a network, the eUICC may send at least one request to connect to an available network. For example, if the eUICC 112 determines that the computing device 102(1) is not connected to any of the networks 106(1) to 106(N+1), then the eUICC may identify available networks of the networks 106(1) to 106(N+1) and send a request to connect to one of the available networks.

At 1020, after the computing device moves to a new location that is not served by the primary MNO, a secondary MNO subscription profile is activated and the primary MNO subscription profile is deactivated. At 1022, the secondary MNO profile may be designated as the home network. For example, in FIG. 3, after the computing device 102(P) is moved from the first location 302 to the second location 306, the computing device may receive the secondary MNO(N) profile 122, activate the secondary MNO(N) profile 122, and deactivate the primary MNO profile 118. The eUICC 112 may set the secondary MNO(N) profile 122 as the home network.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A computer-implemented method comprising:
 determining, by a universal integrated circuit card (UICC) of a computing device, whether the computing device is connected to a network;

determining, by the UICC, whether a primary mobile network operator (MNO) profile associated with a primary MNO is active;
determining, by the UICC, a number of unacknowledged messages; and
setting, by the UICC, the primary MNO profile to active in response to determining that:
the computing device is connected to the network;
the primary MNO profile is inactive; and
the number of unacknowledged messages satisfies a predetermined threshold.

2. The computer-implemented method of claim 1, further comprising:
sending a message to a server associated with the primary MNO.

3. The computer-implemented method of claim 2, further comprising:
receiving, from the server, an acknowledgement to the message; and
re-setting the number of unacknowledged messages to an initial value.

4. The computer-implemented method of claim 2, further comprising:
determining, after a predetermined period of time, that an acknowledgement to the message was not received from the server; and
incrementing the number of unacknowledged messages.

5. The computer-implemented method of claim 1, further comprising:
in response to determining that the computing device is not connected to the network, requesting to connect to at least one available network.

6. The computer-implemented method of claim 1, further comprising:
receiving a secondary MNO profile after the computing device has moved to a new location where the primary MNO does not provide service.

7. The computer-implemented method of claim 6, further comprising:
setting the primary MNO profile to inactive; and
setting the secondary MNO profile to active.

8. A computing device comprising:
one or more processors;
one or more non-transitory computer-readable media storing instructions executable by the one or more processors; and
a Universal Integrated Circuit Card (UICC) including at least one subscription profile, the UICC configured to perform operations comprising:
determining that:
the computing device is connected to a network;
the at least one subscription profile includes a primary mobile network operator (MNO) profile; and
a number of unacknowledged messages satisfies a predetermined threshold; and
based at least in part on determining that the number of unacknowledged messages satisfies the predetermined threshold, designating the primary MNO profile as a home network.

9. The computing device of claim 8, the operations further comprising:
receiving, from a server, an acknowledgement to a message sent from the computing device to the server; and
resetting the number of unacknowledged messages to an initial value.

10. The computing device of claim 8, the operations further comprising:
determining that a message sent from the computing device to a server was unacknowledged; and
incrementing the number of unacknowledged messages.

11. The computing device of claim 8, the operations further comprising:
determining that the computing device is not connected to any network;
identifying one or more available networks; and
requesting to connect to at least one available network of the one or more available networks.

12. The computing device of claim 8, wherein:
the primary MNO provides network service in a first geographic location; and
a secondary MNO provides network service in a second geographic location.

13. The computing device of claim 12, the operations further comprising:
after the computing device has moved to the second geographic location from the first geographic location:
activating a secondary MNO profile associated with the secondary MNO;
designating the secondary MNO profile as the home network; and
deactivating the primary MNO profile.

14. A computer implemented method comprising:
determining, by a universal integrated circuit card (UICC) of a computing device, whether a computing device is connected to a network;
determining, by the UICC, whether a primary mobile network operator (MNO) profile is active, the primary MNO profile associated with a primary MNO;
determining, by the UICC, a number of messages that were unacknowledged by a server of the primary MNO; and
setting, by the UICC, the primary MNO profile to active based at least in part on:
whether the computing device is connected to the network;
whether the primary MNO profile is active; and
whether the number of unacknowledged messages satisfies a predetermined threshold.

15. The computer implemented method of claim 14, further comprising:
receiving, from the server, an acknowledgement to a message sent from the computing device to the server; and
resetting the number of unacknowledged messages to an initial value.

16. The computer implemented method of claim 14, further comprising:
determining that a message sent from the computing device to the server was unacknowledged; and
incrementing the number of unacknowledged messages.

17. The computer implemented method of claim 14, further comprising:
determining that the computing device is unconnected to the network; and
requesting to connect to at least one available network.

18. The computer implemented method of claim 14, wherein:
the primary MNO provides network service in a first geographic location; and
a secondary MNO provides network service in a second geographic location that does not overlap with the first geographic area.

19. The computer implemented method of claim 18, further comprising:

after the computing device has moved to the second geographic location from the first geographic location and has stayed in the second geographic location for at least a predetermined period of time:
   activating a secondary MNO profile associated with the secondary MNO;
   designating the secondary MNO profile as the home network; and
   deactivating the primary MNO profile.

20. The computer implemented method of claim 19, further comprising:
after the computing device has moved back to the first geographic location from the second geographic location:
   activating the primary MNO profile associated with the primary MNO;
   designating the primary MNO profile as the home network; and
   deactivating the secondary MNO profile.

\* \* \* \* \*